(12) United States Patent
Kim et al.

(10) Patent No.: US 8,481,636 B2
(45) Date of Patent: Jul. 9, 2013

(54) POLYOLEFIN RESIN COMPOSITION FOR ANTI-SCRATCH IMPROVEMENT AND AUTOMOTIVE PRODUCT PREPARED FROM THE COMPOSITION

(75) Inventors: Dae Sik Kim, Gyeonggi-do (KR); Seok Hwan Kim, Gyeonggi-do (KR); Jung Gyun Noh, Gyeonggi-do (KR); Sung Min Cho, Daejeon (KR); Seung Wook Park, Daejeon (KR); Tae Sik Moon, Daejeon (KR); Chang Youn Kim, Daejeon (KR)

(73) Assignees: Hyundai Motor Company, Seoul (KR); Honam Petrochemical Corporation, Seoul (KR)

( * ) Notice: Subject to any disclaimer, the term of this patent is extended or adjusted under 35 U.S.C. 154(b) by 207 days.

(21) Appl. No.: 13/040,675

(22) Filed: Mar. 4, 2011

(65) Prior Publication Data
US 2012/0136104 A1    May 31, 2012

(30) Foreign Application Priority Data
Nov. 26, 2010    (KR) .................... 10-2010-0119157

(51) Int. Cl.
*C08K 5/00* (2006.01)
*C08K 3/22* (2006.01)
(52) U.S. Cl.
USPC .......................................... 524/515; 524/433

(58) Field of Classification Search
USPC .......................................... 524/515
See application file for complete search history.

(56) References Cited

U.S. PATENT DOCUMENTS
2003/0229169 A1* 12/2003 Han et al. ............... 524/400

FOREIGN PATENT DOCUMENTS

| | | |
|---|---|---|
| JP | 09165478 A | 6/1997 |
| JP | 2006241454 A | 9/2006 |
| KR | 10-0706011 | 6/2001 |
| KR | 10-0475946 | 12/2003 |
| KR | 10-2004-0008806 | 1/2004 |
| KR | 10-2005-0023127 | 3/2005 |
| KR | 10-2007-0028736 | 3/2007 |
| KR | 10-0811922 | 3/2008 |
| KR | 10-2010-0007153 | 1/2010 |
| KR | 10-2010-0044399 A | 4/2010 |

* cited by examiner

*Primary Examiner* — Hui Chin
(74) *Attorney, Agent, or Firm* — Edwards Wildman Palmer LLP; Peter F. Corless

(57) ABSTRACT

Provided is a polyolefin resin composition including: an ultra-high crystalline polypropylene resin, e.g. about 40-80 wt %, having an isotactic index of about 99.5 or higher; a branched polypropylene, e.g., about 10-20 wt %, having a branching index of about 7 or higher; a thermoplastic elastomer, e.g., about 1-20 wt %; an inorganic filler, e.g., about 1-30 wt %; and a fluoroacrylic copolymer-based amide polymer compound, e.g., about 2-6 wt %.

16 Claims, 1 Drawing Sheet

POLYOLEFIN RESIN COMPOSITION FOR ANTI-SCRATCH IMPROVEMENT AND AUTOMOTIVE PRODUCT PREPARED FROM THE COMPOSITION

CROSS-REFERENCE TO RELATED APPLICATIONS

This application claims priority under 35 U.S.C. §119 to Korean Patent Application No. 10-2010-0119157, filed on Nov. 26, 2010, in the Korean Intellectual Property Office, the disclosure of which is incorporated herein by reference in its entirety.

BACKGROUND (a) Technical Field

The present invention relates to a polyolefin resin composition having increased surface scratch resistance. More particularly, it relates to a polyolefin resin composition having increased surface scratch resistance, impact resistance, rigidity and dimensional stability and thus being useful for automotive interior/exterior parts, and a plastic article prepared using the same.

(b) Background Art

Due to excellent moldability, impact resistance, chemical resistance, etc., as well as low specific gravity and manufacturing cost, polypropylene composite resins have been widely used in the manufacture of automotive interior/exterior parts requiring both safety and functionality, including bumpers, instrument panels, door trim panels and interior trims. However, the polypropylene resin compositions developed thus far are not immune to surface scratches or other appearance-related problems in an uncoated state.

At present, some automotive interior parts, e.g., instrument panels, door trim panels and interior trims, are produced by the mold-in-color (MIC) process requiring no coating after injection in order to reduce production cost. However, since the uncoated parts are very vulnerable to scratches, the surface of the molded parts are easily damaged or contaminated by the hands or shoes of the driver or passengers, resulting in poor appearance. Thus, the resin composition used for these automotive interior parts need to have improved impact strength, rigidity, scratch resistance and antistatic properties while satisfying both safety and sensibility requirements.

Currently, the bumper fascia, an automotive exterior part, is fabricated by injection molding followed by coating. During transportation for coating or other post-processing or during storage, the injection molded part may be scratched. The scratched portion tends to result in poor appearance even after paint coating. Also, since dust or other impurities are easily attached to the injection molded part due to static electricity, it is essential to clean the part prior to its coating.

Recently, research has been focused on an MIC bumper fascia requiring no paint coating in order to reduce production cost. For this purpose, impact resistance and weather resistance are basically required properties, and, in particular, superior scratch resistance and antistatic properties are required. The resin composition used for the automotive interior parts such as door trim, instrument panel, glove box or console also needs to have improved impact strength, scratch resistance and antistatic property while satisfying both safety and sensibility requirements. Thus, a resin composition having superior scratch resistance and mechanical properties that can be used for the automotive interior/exterior parts is greatly needed.

Although research has been consistently underway to develop resin compositions for automotive interior/exterior parts having superior scratch resistance, there has been still no substantial result reported. Korean Patent Application Publication No. 10-2005-0093186 describes a polypropylene resin composition having improved scratch resistance, comprising an inorganic filler, a rubber and a silicone resin. However, it does not exhibit satisfactory flexural modulus, tensile strength or scratch resistance enough to be used for automotive interior/exterior parts. Further, the added silicone resin tends to move toward the surface during molding, resulting in poor appearance such as stains or gas traces.

The inventors of the present invention have also invented a polyolefin resin composition having improved scratch resistance and a plastic article prepared using the same (Korean Patent No. 986,798). However, one noted disadvantage is that although the polyolefin resin composition is applicable to interior trims, it is inapplicable to instrument panels or door trim panels requiring stricter scratch resistance.

Accordingly, development of a polypropylene resin composition for automotive interior/exterior parts having an even more improved scratch resistance and exhibiting satisfactory impact resistance, rigidity and dimensional stability is an urgent task in the automotive industry.

SUMMARY

The present invention provides a resin composition having superior impact resistance, rigidity, dimensional stability and scratch resistance.

In one general aspect, the present invention provides a polyolefin resin composition including an ultra-high crystalline polypropylene resin, e.g., about 40-80 wt %, having an isotactic index of, e.g., 99.5 or higher; a branched polypropylene, e.g., about 10-20 wt %, having a branching index of, e.g., 7 or higher; a thermoplastic elastomer, e.g., about 1-20 wt %; an inorganic filler, e.g., 1-30 wt %; and a fluoroacrylic copolymer-based amide polymer compound, e.g., 2-6 wt %.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the disclosure, and wherein.

Figure 1:
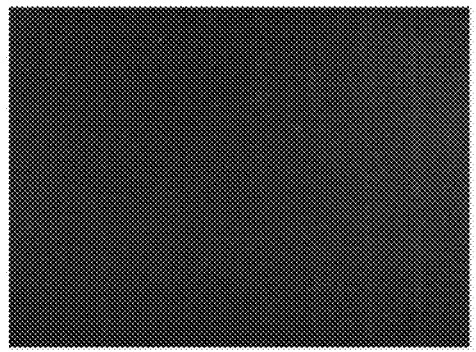
FIG. 1 shows an image of an exemplary composition prepared in Example 3 after a scratch resistance test.
Figure 2:
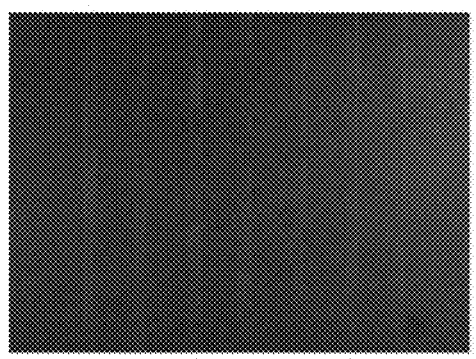
FIG. 2 shows an image of an exemplary composition prepared in Example 4 after a scratch resistance test.
Figure 3:
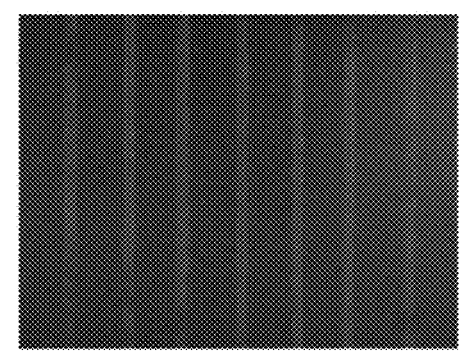
FIG. 3 shows an image of an exemplary composition prepared in Comparative Example 1 after a scratch resistance test.

It should be understood that the appended drawings are not necessarily to scale, presenting a somewhat simplified representation of various preferred features illustrative of the basic principles of the disclosure. The specific design features of the disclosure as disclosed herein, including, for example, specific dimensions, orientations, locations and shapes, will be determined in part by the particular intended application and use environment.

DETAILED DESCRIPTION

Hereinafter, reference will now be made in detail to various embodiments of the present invention, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present invention provides a polyolefin resin composition including: an ultra-high crystalline polypropylene resin, about 40-80 wt %, having an isotactic index (II) of, e.g., 99.5 or higher; a branched polypropylene (long-chain branched PP; LCB-PP), e.g., about 10-20 wt %, having a branching index (BI) of, e.g., 7 or higher; a thermoplastic elastomer, e.g., about 1-20 wt %; an inorganic filler, e.g., about 1-30 wt %; and a fluoroacrylic copolymer-based amide polymer compound, e.g., about 2-6 wt %.

High crystalline polypropylene with high crystallinity, also known as high isotactic polypropylene (HIPP) or high stiffness polypropylene (HSPP), can replace existing polypropylene for the purpose of improving impact resistance, hardness and scratch resistance. Because high crystalline polypropylene has higher crystallinity than the existing commercially available polypropylene, it exhibits about 20-40% higher rigidity as compared to the existing polypropylene and improved heat resistance and scratch resistance, while providing comparable impact resistance.

The currently widely used stereoregular polypropylene has an isotactic index ranging from, e.g., about 94 to 97. However, the ultra-high crystalline polypropylene used in an exemplary embodiment of the present invention has an isotactic index of at least 99.5. That is, the higher the isotactic index, the higher the crystallinity of polypropylene.

This resin composition comprising the ultra-high crystalline polypropylene may be used in all automotive interior/exterior parts. Especially, it may be used in the parts where superior rigidity or heat resistance is required or where weight reduction by decreasing the addition amount of inorganic filler is desired. In an exemplary embodiment of the present invention, the ultra-high crystalline polypropylene resin having an isotactic index of about 99.5 or higher is comprised in an amount of, e.g. about 40-80 wt %, based on the total resin composition. Within this exemplary range, moldability, impact resistance and chemical resistance sufficient for use in automotive interior/exterior parts are attained.

The ultra-high crystalline polypropylene resin may be of any type as long as the isotactic index is about 99.5 or higher. Specifically, it may comprise a propylene homopolymer or a copolymer of propylene and about 12 mol % or less of ethylene or a $C_4$-$C_{10}$ olefin monomer. More specifically, a copolymer of propylene and about 12 mol % or less of ethylene may be used. If the ultra-high crystalline polypropylene copolymer comprises a propylene homopolymer or a copolymer of propylene and about 12 mol % or less of ethylene or a $C_4$-$C_{10}$ olefin monomer, increased rigidity and impact resistance are attained. Especially, when it comprises a copolymer of propylene and about 10 mol % or less of ethylene, scratch resistance is improved effectively due to reduced decrease in surface hardness.

The ultra-high crystalline polypropylene resin may have a melt index of, e.g., about 8-150 g/10 min (230° C., 2.16 kgf). If the melt index of the polypropylene resin is lower than, e.g., about 8 g/10 min (230° C., 2.16 kgf), moldability may be unsatisfactory. On the contrary, if it exceeds, e.g., about 150 g/10 min (230° C., 2.16 kgf), its impact strength may deteriorate.

The branched polypropylene exhibits improved mechanical properties, moldability, chemical resistance and heat resistance because it has long-chain branches on the polypropylene backbone. Since polypropylene produced by Ziegler-Natta catalysis has linear polymer structure, it exhibits poor mechanical properties, especially scratch resistance and heat resistance. The most effective way of forming long-chain branches is to introduce them into the polypropylene backbone. Usually, it is accomplished by breaking the polypropylene chains using an organic peroxide having an appropriate half-life and then forming the branches through re-arrangement under an adequate reaction condition.

As a result, the branched polypropylene has long chains unlike linear polypropylene, and, thus has improved scratch resistance, tensile strength, flexural strength and flexural modulus.

The degree of branching of the branched polypropylene is determined by the branching index. The higher the branching index, the more the long-chain branches, resulting in formation of tie molecules. The tie molecules strengthen the crystal structure by linking the lamellae of the polypropylene crystal, thus resulting in improved mechanical properties, particularly scratch resistance and rigidity. When the branching index is, e.g., 7 or higher, the long-chain branches are longer than the thickness of the lamellae, thus firmly linking two lamellae as tie molecules. The branched polypropylene may be comprised in an amount of, e.g., about 10-20 wt % based on the total polyolefin resin composition. Within this range, it exhibits superior synergic effect of improving scratch resistance and mechanical properties of the resin composition together with the ultra-high crystalline polypropylene.

The thermoplastic elastomer is used to enhance impact resistance and is not particularly limited. For instances, a copolymer of ethylene and $C_2$-$C_{10}$ α-olefin may be used. In this embodiment, the α-olefin is not particularly limited. For example, it may be one or more selected from the group consisting of propylene, butene, pentene, hexene, propene and octene. More specifically, the thermoplastic elastomer may be one or more selected from the group consisting of ethylene-propylene rubber (EPR), ethylene-propylene-diene (EPDM) rubber, ethylene-butene copolymer rubber (EBR), ethylene-octene copolymer rubber (EOR) and styrene-butadiene rubber (SBR). Ethylene-octene copolymer rubber may be selected among them, since it exhibits the best improvement in impact strength as well as relatively reduced decrease in rigidity due to the octene groups on the long side chains. More specifically, the ethylene-butene copolymer rubber may be one comprising e.g., about 50% or more of the butene comononer and having a melt index of about 0.5-150 g/10 min (190° C., 2.6 kgf) and a density of about 0.868-0.885 g/cc.

The inorganic filler is used to enhance heat resistance and rigidity and is not particularly limited. Specifically, it may be one or more selected from the group consisting of talc, calcium carbonate, wollastonite, calcium sulfate, magnesium oxide, calcium stearate, mica, silica, calcium silicate, clay and carbon black. Specifically, the inorganic filler may be one exhibiting distinct increase in rigidity and hardness of the resin composition as its addition amount increases. Thus, more specifically, wollastonite or talc may be used. Specifically, the inorganic filler may have an average particle diameter of, e.g., about 1-30 μm, more specifically, e.g., about 5-10 μm. For example, if the average particle diameter of the inorganic filler is smaller than 1 μm, enhancement of heat resistance and rigidity may be insufficient. And, if the average particle diameter exceeds about 30 μm, handling and working may be difficult during extrusion molding of the polyolefin resin composition.

The fluoroacrylic copolymer-based amide polymer compound is used to maximize surface scratch resistance along with the ultra-high crystalline polypropylene and the branched polypropylene. Whereas the ultra-high crystalline polypropylene and the branched polypropylene improve surface scratch resistance and mechanical properties by providing structural rigidity, the fluoroacrylic copolymer-based amide polymer compound minimizes invasion of scratch-inducing materials on the surface with excellent surface slip property of the fatty acid amide and fluorine moieties and excellent surface resistance of the acryl moiety. The fluoroacrylic copolymer-based amide polymer compound may have a number average molecular weight of about 50,000-100,000. Formerly, silicone-based lubricants were used instead of the fluoroacrylic copolymer-based amide polymer compound. Although the silicone-based lubricant improves scratch resistance by lowering surface resistance, stains or gas traces may be formed on the surface of the molded part. In addition, since the silicone-based lubricant mostly has a smaller number average molecular weight of about 10,000-25,000, physical properties may be unsatisfactory when it is used in an amount exceeding about 3 wt %.

A plastic article prepared from the polyolefin resin composition according to the present invention may be used in many applications, without particular limitation. Specifically, it may be used for automotive interior/exterior parts. More specifically, it may be used for the automotive interior parts such as door trims, instrument panels, consoles, etc. or the automotive exterior parts such as mold-in-color (MIC) bumper fasciae.

EXAMPLES

The examples and experiments will now be described. The following examples and experiments are for illustrative purposes only and not intended to limit the scope of this disclosure.

Examples 1-5

Preparation of Polyolefin Resin Composition

The components described in Table 1 were mixed for 3 minutes in a Henschel mixer, extruded at about 190-250° C. using a twin extruder, cooled and then solidified to obtain polyolefin resin compositions in pellet form.

TABLE 1

| | Ultra-high crystalline PP resin (wt %) | Branched PP resin (wt %) | Thermoplastic elastomer (wt %) | Inorganic filler (wt %) | Fluoroacrylic copolymer-based amide polymer compound (wt %) |
|---|---|---|---|---|---|
| Ex. 1 | 76 | 15 | 10 | 5 | 4 |
| Ex. 2 | 78 | 15 | 10 | 5 | 2 |
| Ex. 3 | 74 | 15 | 10 | 5 | 6 |
| Ex. 4 | 46 | 20 | 20 | 10 | 4 |
| Ex. 5 | 76 | 10 | 5 | 5 | 4 |

Ultra-high crystalline polypropylene resin: II = 99.7, JSS-375N (Honam Petrochemical)
Branched polypropylene resin: BI = 7.5, SMS-700 (Honam Petrochemical)
Thermoplastic elastomer: Butene comonomer content ≧50 wt %, DF-605 (Mitsui Chemicals)
Inorganic filler: 58-61 wt % $SiO_2$, 31-34 wt % MgO, KCM6300 (KOCH)
Fluoroacrylic copolymer-based amide polymer compound: $M_n$ = 50,000-100,000, FS-830 (CN Tech)

Comparative Examples 1-5

Preparation of Polyolefin Resin Composition

Polyolefin resin compositions were obtained in pellet form in the same manner as Examples, using the components described in Table 2.

TABLE 2

| | High crystalline PP resin (wt %) | Branched PP resin (wt %) | Thermoplastic elastomer (wt %) | Inorganic filler (wt %) | Fluoroacrylic copolymer-based amide polymer compound (wt %) | Silicone-based lubricant (wt %) |
|---|---|---|---|---|---|---|
| Comp. Ex. 1 | 76 | 15 | 10 | 5 | 4 | — |
| Comp. Ex. 2 | 72 | 15 | 10 | 5 | 4 | 4 |
| Comp. Ex. 3 | 81 | 5 | 5 | 5 | 4 | — |
| Comp. Ex. 4 | 61 | 25 | 5 | 5 | 4 | — |
| Comp. Ex. 5 | 80 | 15 | 10 | 5 | — | — |

High crystalline polypropylene resin: II = 99, JSS-370N (Honam Petrochemical)
Branched polypropylene resin: BI = 6.5, SMS-531 (Honam Petrochemical)
Thermoplastic elastomer: Butene comonomer content ≧50 wt %, DF-605 (Mitsui Chemicals)
Inorganic filler: 58-61 wt % $SiO_2$, 31-34 wt % MgO, KCM6300 (KOCH)
Silicone-based lubricant: 65 wt % polydimethylsiloxane, 35 wt % fumed silica, $M_w$ = 10,000,000-30,0000,000, MB50-110 (Dow Corning)
Fluoroacrylic copolymer-based amide polymer compound: $M_n$ = 50,000-100,000, FS-830 (CN Tech)

The compositions prepared in Example and Comparative Examples were injection molded at about 180-250° C. depending on their melt indices and physical properties were measured as follows.

Test Example

Physical Properties of Polyolefin Resin Compositions

1) Melt index was measured according to ASTM D-1238. Test was performed at 230° C. and 2.16 kgf.

2) Flexural modulus and flexural strength were measured according to ASTM D-790. Test specimen was 12.7×127×6.4 mm in size, and crosshead speed was 28 mm/min.

3) Izod impact strength was measured according to ASTM D-256. Test specimen was 63.5×12.7×3 mm in size.

4) Heat deflection temperature (HDT) was measured according to ASTM D-648. Test specimen was 0.7×127×6.4 mm in size, and load was 4.6 kgf.

5) Scratch resistance [load=5 N, stroke=100 mm, speed=100 mm/s] was evaluated according to the criterion described in Table 3.

TABLE 3

| | Evaluation standard | |
|---|---|---|
| Score | Scratch width (μm) | Appearance |
| 5 | <20 | Almost nonexistent surface damage |
| 4 | 100-200 | No distinct surface damage |
| 3 | 200-300 | Slight surface damage |

TABLE 3-continued

Evaluation standard

| Score | Scratch width (μm) | Appearance |
|---|---|---|
| 2 | 300-400 | Whitening as well as distinct surface damage |
| 1 | >400 | Severe surface damage |

Note:
Grade 3 or higher is adequate for automotive interior parts.

Physical properties of the polyolefin resin compositions of Example and Comparative Examples are given in Table 4.

TABLE 4

|  | Melt index (g/10 min) | Flexural modulus (kg/cm$^2$) | Izod impact strength (kg · cm/cm) at −10° C. | Scratch resistance (score) |
|---|---|---|---|---|
| Example 1 | 26 | 22,000 | 14.7 | 4.0 |
| Example 2 | 25 | 21,400 | 15.3 | 3.5* |
| Example 3 | 25 | 21,000 | 15.2 | 4.0 |
| Example 4 | 17 | 24,000 | 10.4 | 3.5* |
| Example 5 | 28 | 26,000 | 7.2 | 4.5** |
| Comparative Example 1 | 25 | 21,800 | 14.2 | 2.0 |
| Comparative Example 2 | 25 | 21,900 | 14.1 | 2.0 |
| Comparative Example 3 | 29 | 25,000 | 9.4 | 2.0 |
| Comparative Example 4 | 18 | 16,000 | 18.2 | 2.0 |
| Comparative Example 5 | 25 | 22,500 | 14.2 | 2.0 |

*3.5: Scratch width corresponds to score 3, but surface state is better.
**4.5: Scratch width corresponds to score 4, but surface state is better.

As seen from Table 4, the polyolefin resin compositions comprising the ultra-high crystalline polypropylene resin having an isotactic index of about 99.5 or higher, the branched polypropylene having a branching index of about 7 or higher and the fluoroacrylic copolymer-based amide polymer compound exhibited better scratch resistance and mechanical properties than those of Comparative Examples.

Accordingly, the polyolefin resin compositions of the Examples and the plastic articles prepared therefrom may be widely applicable to applications requiring superior scratch resistance and mechanical properties. Further, since no additional paint coating is required, cost reduction and productivity improvement may be attained.

The polyolefin resin composition according to the present invention, which comprises an ultra-high crystalline polypropylene resin having an isotactic index of about 99.5 or higher and a branched polypropylene, exhibits superior scratch resistance and mechanical properties. Thus, cost reduction and productivity improvement may be attained since no additional paint coating is required. Accordingly, it is widely applicable to automotive interior/exterior parts.

All patents, published patent applications and other references disclosed herein are hereby expressly incorporated by reference in their entireties by reference.

The present invention has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A polyolefin resin composition comprising:
   40-80 wt % of an ultra-high crystalline polypropylene resin having an isotactic index of 99.5 or higher;
   10-20 wt % of a branched polypropylene having a branching index of 7 or higher;
   1-20 wt % of a thermoplastic elastomer;
   1-30 wt % of an inorganic filler; and
   2-6 wt % of a fluoroacrylic copolymer-based amide polymer compound.

2. The polyolefin resin composition according to claim 1, wherein the ultra-high crystalline polypropylene resin comprises a propylene homopolymer or a copolymer of propylene and 12 mol % or less of ethylene or a $C_4$-$C_{10}$ olefin monomer.

3. The polyolefin resin composition according to claim 1, wherein the ultra-high crystalline polypropylene resin has a melt index of 8-150 g/10 min (230° C., 2.16 kgf).

4. The polyolefin resin composition according to claim 1, wherein the thermoplastic elastomer comprises a copolymer of ethylene and $C_2$-$C_{10}$ α-olefin.

5. The polyolefin resin composition according to claim 4, wherein the α-olefin is one or more selected from the group consisting of propylene, butene, pentene, hexene, propene and octene.

6. The polyolefin resin composition according to claim 1, wherein the inorganic filler is one or more selected from the group consisting of talc, calcium carbonate, wollastonite, calcium sulfate, magnesium oxide, calcium stearate, mica, calcium silicate, clay and carbon black.

7. The polyolefin resin composition according to claim 1, wherein the inorganic filler has an average particle diameter of 1-30 μm.

8. The polyolefin resin composition according to claim 1, wherein the fluoroacrylic copolymer-based amide polymer compound has a number average molecular weight of 50,000-100,000.

9. The polyolefin resin composition according to claim 1, wherein a plastic article is prepared from the polyolefin resin composition.

10. The polyolefin resin composition according to claim 2, wherein a plastic article is prepared from the polyolefin resin composition.

11. The polyolefin resin composition according to claim 3, wherein a plastic article is prepared from the polyolefin resin composition.

12. The polyolefin resin composition according to claim 4, wherein a plastic article is prepared from the polyolefin resin composition.

13. The polyolefin resin composition according to claim 5, wherein a plastic article is prepared from the polyolefin resin composition.

14. The polyolefin resin composition according to claim 6, wherein a plastic article is prepared from the polyolefin resin composition.

15. The polyolefin resin composition according to claim 7, wherein a plastic article is prepared from the polyolefin resin composition.

16. The polyolefin resin composition according to claim 8, wherein a plastic article is prepared from the polyolefin resin composition.

* * * * *